W. F. BERRYMAN.
EXPANSION UNION.
APPLICATION FILED MAR. 18, 1916.
1,206,658. Patented Nov. 28, 1916.
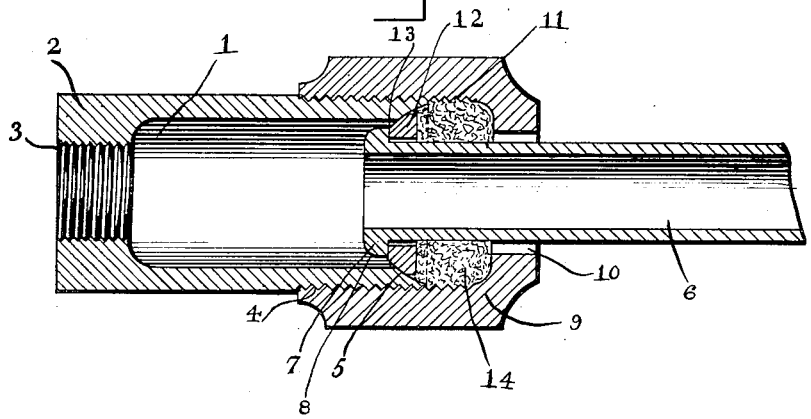
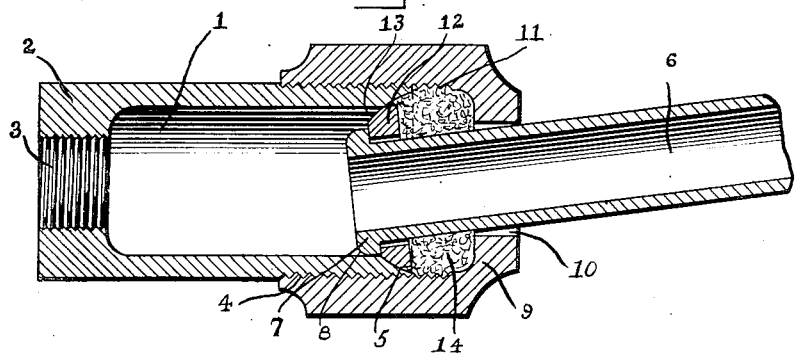
Witness
John D. Spalding.
Inventor
W. F. Berryman.
By Victor J. Evans
Attorney

UNITED STATES PATENT OFFICE.

WILLIAM F. BERRYMAN, OF MIDDLETOWN, OHIO.

EXPANSION-UNION.

1,206,658.   Specification of Letters Patent.   Patented Nov. 28, 1916.

Application filed March 18, 1916. Serial No. 85,149.

*To all whom it may concern:*

Be it known that I, WILLIAM F. BERRYMAN, a citizen of the United States, residing at Middletown, in the county of Butler and State of Ohio, have invented new and useful Improvements in Expansion-Unions, of which the following is a specification.

This invention relates to improvements in extension and adjustable pipes for use in conducting gas, compressed air, steam and other fluids.

Another object of the invention is to provide an extensible and adjustable pipe which includes two pipe members of relatively different diameters one slidable within the other and the member containing a packing substance adjustable on one of the pipe sections and serving to permit of said section coming in direct compressing contact with the packing substance to seal the joint of both of the pipe sections to permit of the free sliding movement of one of the pipe sections in the other pipe section.

A further object of the invention is to provide an adjustable and extensible pipe comprising two pipe sections of relatively different diameters, one slidable within the other, a member containing a suitable packing substance on one of said pipe sections and serving to permit said section to come in direct compressing contact with the said packing substance to seal the joint between both pipe sections, and one of said pipe sections while free to slide within the other pipe section is also permitted to be retained at an angle with relation to the other pipe section so that the sections may be connected with other pipes which are not in true alinement.

With the above and other objects in view, the improvement resides in the construction, combination and arrangement of parts set forth in the following specification and falling within the scope of the appended claim.

In the drawing, Figure 1 is a sectional view through an extension pipe or conductor constructed in accordance with the present invention and Fig. 2 is a similar sectional view but illustrating one of the pipe sections arranged at an angle with relation to the other pipe section.

Referring now to the drawings in detail, the numeral 1 designates a pipe section which has one of its ends provided with thickened portions 2 and its inner bore, at its said end formed with threads 3, whereby the section 1 may be connected to an exteriorly threaded pipe. The other end of the pipe section 1 is formed with exterior threads 4, and the said end is dished, as at 5, to its bore.

The numeral 6 designates a pipe section of a smaller diameter than that of the pipe 1, the same having one of its ends provided with an annular flange 7, the outer edge of the same being round, as indicated by the numeral 8. The flanged end of the pipe is adapted to be telescoped within the pipe 1, and surrounding the pipe 6 is a gland or packing box 9, the opening in the said box through which the pipe 6 extends, indicated by the numeral 10, being of a greater diameter than that of the pipe 6, but of a less diameter than the flanged or beaded end 7 of the said pipe 6. The packing box is provided with interior threads 11 which are engaged by the exterior threads 4 of the pipe section 1, and the numeral 12 designates a packing ring which is arranged within the said box, the said ring having its outer face flared or rounded, as at 13, to engage within the dished mouth 11 of the pipe 1, the flat surface of the ring contacting with a compressible packing substance 14 that is arranged within the box 9. The face of the opening 10 is of a less diameter than that of the interior cross sectional diameter of the pipe 1, so that a shoulder is provided between the edges of said pipe 1 and the outer face of the box 9 whereby the compressible material may be forced within the opening 10 when the pipe member 1 is adjusted upon the box or vice versa. By providing the opening 10 of a greater area than that of the cross sectional diameter of the pipe 6, it will be noted that the said pipe 6 may be retained at an angle to the longitudinally extending pipe section 1 and the packing box 9, this being permitted by having the cross sectional diameter of the flange 7 of a less width than the interior cross sectional diameter of the pipe 1.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

A pipe joint comprising two pipe sections of relatively different diameters, one slidable within the other, the large pipe having its confronting edge formed with an annular groove which is arcuate shape in cross section, a packing ring mounted in said groove and having its outer face rounded, the opposite sides of the ring being flat, an annular packing box threadedly mounted upon the inner confronting edge of the larger pipe and having its outer end formed with an inwardly extending annular flange, compressing packing material mounted within the box, said flange coöperating with said ring to hold the packing within the box, said smaller pipe being of such a diameter as to loosely fit within said box and said ring, an annular shoulder formed on the inner end of the smaller pipe and engageable with the inner flat side of said ring whereby upon lateral movement of the pipes, the ring will be moved to compress the packing.

In testimony whereof I affix my signature in presence of two witnesses.

WILLIAM F. BERRYMAN.

Witnesses:
HARRY O. MUSEL,
GILES ZEIER.